United States Patent [19]

Azzarello et al.

[11] 4,398,745
[45] Aug. 16, 1983

[54] THREE POINT HITCH LOWER LINK CLAW

[75] Inventors: Joseph A. Azzarello, Palos Heights; Carlos T. San Luis, Villa Park, both of Ill.

[73] Assignee: International Harvester Co., Chicago, Ill.

[21] Appl. No.: 269,236

[22] Filed: Jun. 1, 1981

[51] Int. Cl.³ .............................................. B60D 1/04
[52] U.S. Cl. ................................................... 280/508
[58] Field of Search ............ 280/508, 509, 510, 461 A, 280/460 A, 456 A; 172/439, 271, 275

[56] References Cited

U.S. PATENT DOCUMENTS

| | | | |
|---|---|---|---|
| 2,375,970 | 5/1945 | Williams, Jr. | 280/33.44 |
| 3,090,639 | 5/1963 | Virtue et al. | 280/474 |
| 3,116,075 | 12/1963 | Herschman et al. | 280/479 |
| 3,140,103 | 7/1964 | Virtue et al. | 280/462 |
| 3,172,686 | 3/1965 | Beard | 280/461 |
| 3,434,737 | 3/1969 | Bailey et al. | 280/461 |
| 3,437,355 | 4/1969 | Jeffes | 280/478 |
| 3,498,638 | 3/1970 | Magruder | 280/479 |
| 3,531,140 | 9/1970 | Di Vita et al. | 280/477 |
| 3,544,133 | 12/1970 | Lemmon et al. | 280/479 |
| 3,561,788 | 2/1971 | Carlson et al. | 280/461 |
| 3,561,789 | 2/1971 | Stikeleather et al. | 280/479 |
| 3,572,759 | 3/1971 | Baugh et al. | 280/461 |
| 3,807,769 | 4/1974 | Thompson et al. | 280/479 R |
| 3,829,128 | 8/1974 | Sutton et al. | 280/461 A |
| 3,889,980 | 6/1975 | Geisthoff | 280/461 A |
| 3,961,812 | 6/1976 | von Allwörden | 280/478 R |
| 3,977,698 | 8/1976 | von Allwörden | 280/461 A |
| 4,014,562 | 3/1977 | Kunze | 280/508 |
| 4,018,451 | 4/1977 | Geisthoff | 280/461 A |
| 4,023,822 | 5/1977 | Geisthoff et al. | 280/508 |
| 4,050,715 | 9/1977 | von Allwörden | 280/508 |
| 4,071,263 | 1/1978 | Kunze | 280/508 |
| 4,090,725 | 5/1978 | Perin | 280/479 A |
| 4,108,464 | 8/1978 | von Allwörden et al. | 280/508 |
| 4,147,374 | 4/1979 | Jeffes | 280/478 R |
| 4,157,838 | 6/1979 | von Allwörden | 280/508 |
| 4,176,727 | 12/1979 | Perin | 180/53 R |

FOREIGN PATENT DOCUMENTS

| | | | |
|---|---|---|---|
| 2648071 | 5/1978 | Fed. Rep. of Germany | 172/439 |
| 2720873 | 11/1978 | Fed. Rep. of Germany | 280/461 A |
| 2902407 | 7/1979 | Fed. Rep. of Germany | 280/508 |

Primary Examiner—John A. Pekar
Attorney, Agent, or Firm—Boris Parad; F. David Au Buchon

[57] ABSTRACT

A claw hitch for a lower link of a three point tractor linkage comprising a self-locking mechanism with over-center spring biased lever lockingly engageable with a ball of an implement coupling rod.

11 Claims, 4 Drawing Figures

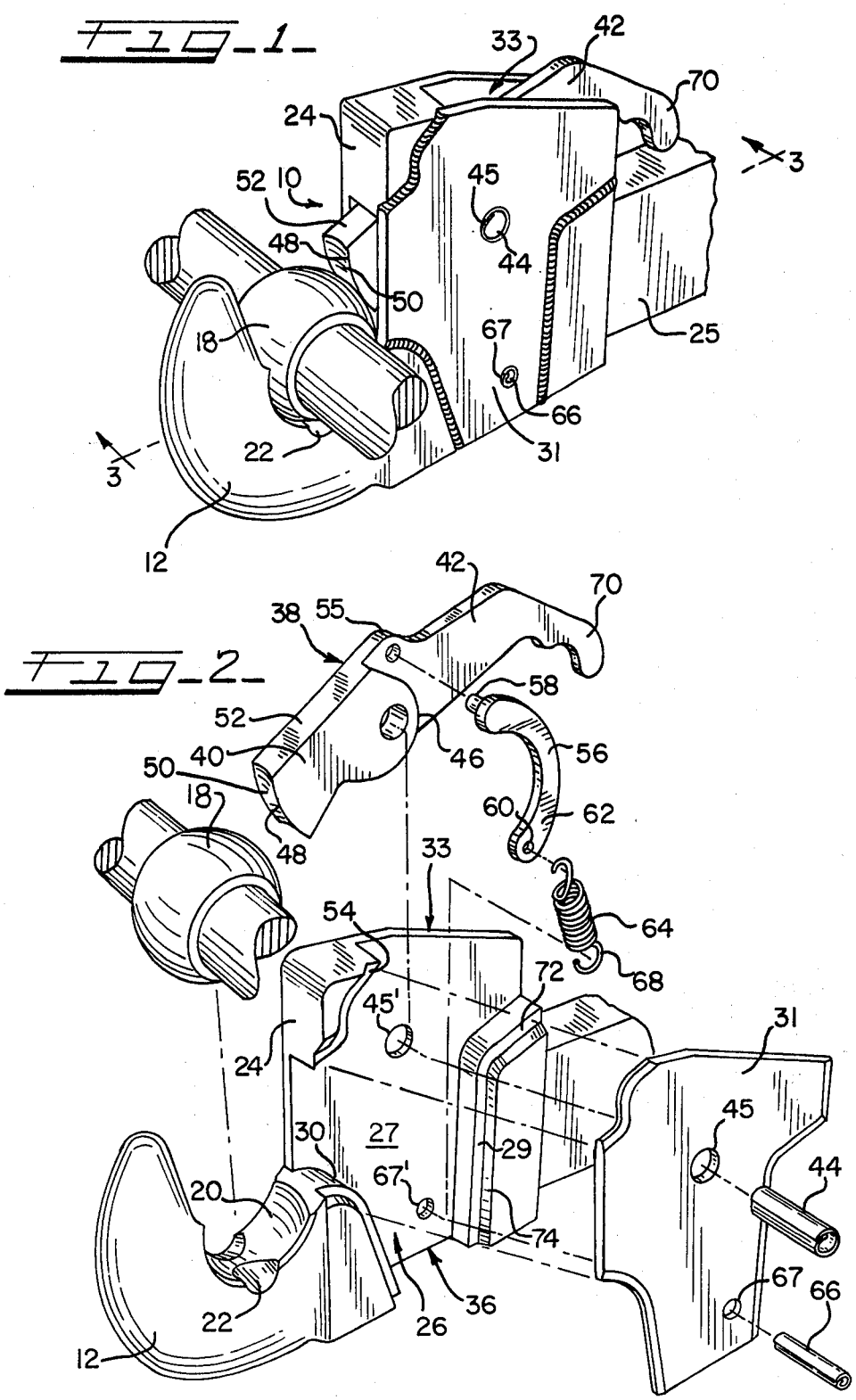

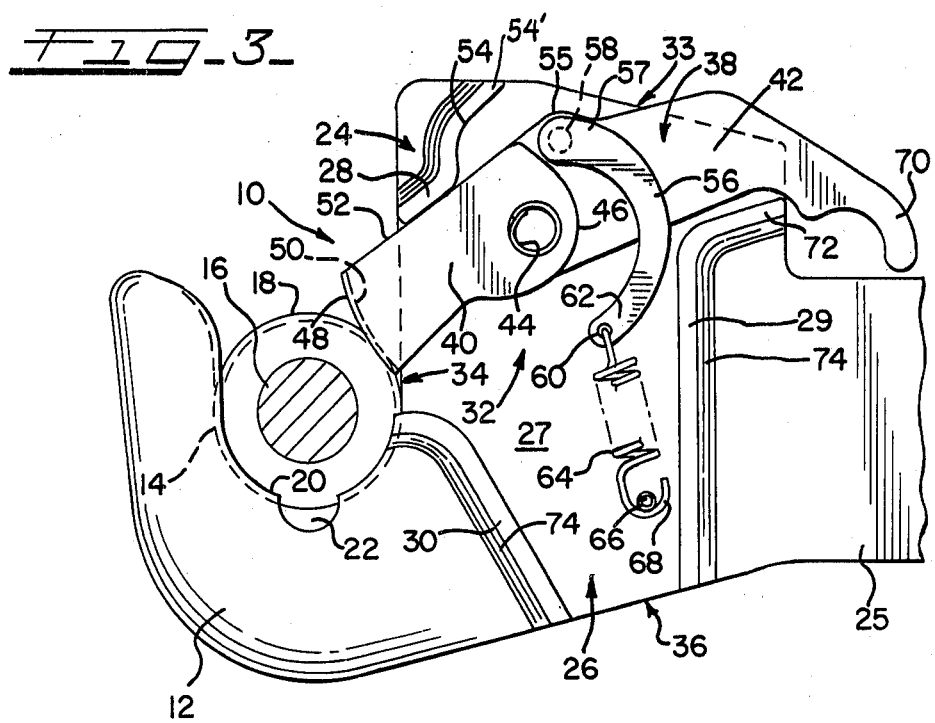
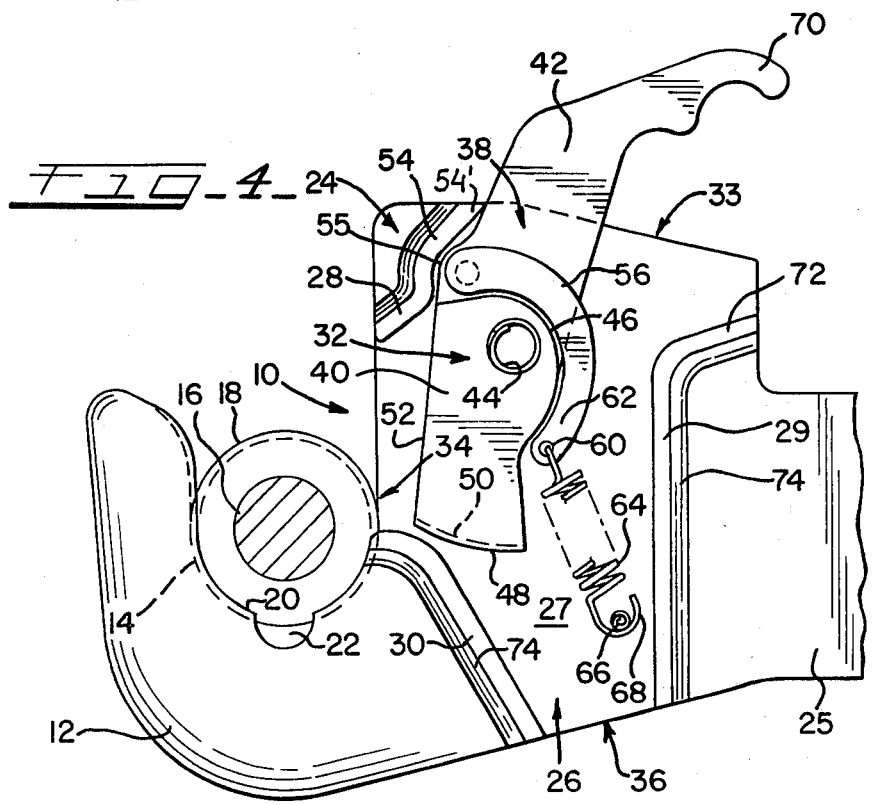

THREE POINT HITCH LOWER LINK CLAW

BACKGROUND OF THE INVENTION

1. Field of the Invention

The present invention relates generally to coupling hooks for a tractor or similar vehicle and more particularly to a coupling hook or claw for lower links of a three point linkage on a farm tractor.

2. Description of the Prior Art

The prior art is replete with coupling hooks for farm tractors employing various latch mechanisms for coupling rods or links of an implement and utilized in the lower link of a three point attachment on a tractor. For example, the U.S. Pat. No. 4,157,838 discloses a locking bolt mechanism which includes an elongated locking bolt pivotally mounted on a lever with a spring biasing the mechanism into the locking position.

The U.S. Pat. No. 4,014,562 discloses a latch with one end pivotally connected to the operating lever and its other end being projected toward the jaw opening into which the coupling pin is received.

The U.S. Pat. No. 4,071,263 discloses the latch which is pivotable and slidable upon a supporting or guiding pin such that when a coupling pin acts upon an unlocking surface of the nose-portion of the latch during a coupling operation, the latch will slide back into the pocket to permit the coupling pin to be received within the hook opening.

The U.S. Pat. No. 4,108,464 discloses the latch element which is arcuate and has opposed curvilinear surfaces one of which is engageable with a fulcrum in the vicinity of an opening in the pocket through which an actuating lever of the latch element extends.

However, none of the disclosed prior art references of record shows such a novel claw hitch structure as disclosed in the subject invention.

SUMMARY OF THE INVENTION

This invention pertains to a tractor claw hitch utilized as one of the lower links of a three point linkage system of a farm tractor. The self-locking claw hitch mounted on a tractor has a coupling hook with a jaw adapted to snugly receive a coupling rod of an implement vehicle. This hook comprises a lock mechanism housing with latch and handle openings. A lock mechanism releasably holds the coupling rod and the jaw in a locking engagement. The lock mechanism comprises a one-piece lever pivotally connected with the housing and movable between locked and unlocked positions. The lever has a latch end reciprocably movable through the latch opening and lockingly engageable with the coupling rod in a locked position. The lever also has a handle end projecting through the handle opening and extending outwardly of said housing. Spring means are mounted on the housing and connected with the lever for over center spring biasing of and urging the lever to remain in the locked and unlocked positions. The housing includes blocking means reactively and abuttingly engageable with the lever in the locked and unlocked positions.

This invention will become more apparent to those having ordinary skills in the art by reference to the following description, drawings and appended claims.

BRIEF DESCRIPTION OF THE DRAWINGS

FIG. 1 is a perspective view of a lower link claw of a tractor three-point hitch.

FIG. 2 is an exploded view of the claw hitch.

FIG. 3 is a sectional view of the claw hitch taken substantially along the line 3—3 of FIG. 1 showing a lock mechanism in a locked position.

FIG. 4 is a sectional view of the claw hitch taken substantially along the line 3—3 of FIG. 1 showing the lock mechanism in an unlocked position.

DETAILED DESCRIPTION OF THE INVENTION

Referring now to the drawings wherein reference characters designate like or corresponding parts throughout the several views, there is shown in FIG. 1 a claw hitch 10, for a farm tractor or similar vehicle, having a coupling claw or hook 12 integral with a 3-point hitch lower link. The hook 12 has a concave jaw or jaw-liner 14 forming an opening adapted to snugly receive one of coupling rods 16 of an implement vehicle (not shown). The coupling rod 16 has a ball 18 which fits in a ball socket 20 of the jaw 14. Dirt exhaust notches 22, which can have a circular trough or other configuration, extend outwardly and downwardly from the ball socket 20. The hook 12 being a one-piece forging comprises a lock mechanism housing 24 and a tine or shank 25 which can be welded to the housing 24. A cavity 26 of the housing 24 is defined by a housing side wall 27, stop bridge wall 28, rear wall 29 and front wall 30. A housing cover 31 is integrally affixed, by welding or any other suitable mechanical means, to the walls 28, 29 and 30 prior to the installation of a lock mechanism 32 within the cavity 26. As best shown in FIGS. 2, 3 and 4, the housing 24 has a top or handle opening 33 located between the bridge wall 28 and rear wall 29, a side or latch opening 34 disposed between the bridge 28 and the front wall 30, and a bottom opening 36 positioned between the front wall 30 and rear wall 29.

The self-locking mechanism 32 comprises a one-piece lever 38 which has a latch end 40 and a handle end 42. The lever 38 is journalled about a lever spring pin 44, which can be an interference pin or other suitable pin means, extending through the openings 45, 45' in the cover 31 and side wall 27, respectively. The latch end 40 transitions into the cross-sectionally narrower handle end 42 thereby forming a shoulder 46 at the place of transition. The shoulder 46 extends inwardly into the housing cavity 26. The latch end 40 has a convex camber projection or portion 48. The projection 48 includes a groove or recess butt 50 which follows the convex configuration of the camber projection 48 and reactively engages the ball 18 of the coupling rod 16. The latch end 40 has an upper side 52 which abuttingly engages the stop bridge 28. The bridge wall 28 includes a recess or pocket 54 contiguously accommodating a jut 55 of the handle end 42. The pocket 54 includes a corner block 54'.

An arcuate link 56 is pivotally connected to the lever 38 at its one end 57 by means of the connecting pin 58 which can be located either on the link 56, as shown in FIG. 2, or on the lever 38 in the jut 55 area. The link 56 has an opening 60 at its another end 62 which is used for a connection with a tension or pull-off coil spring 64. The spring 64 is also hooked to a spring pin 66, projecting through the openings 67 and 67' in the cover 31 and the housing wall 27, respectively, by its hook end 68.

The handle end 42 has a grip portion 70 which is angled downwardly and outwardly of the lever 38 and disposed directly behind the link 56 in the locked position. The grip 70 is adjacent to a rear wall end part 72 in the locked position. Walls 28, 29 and 30 have a rabbet 74 adapted to fittingly receive the cover 31.

In operation, in order to couple an implement or other vehicle to a tractor lower link claw 12 the ball 18 rigidly attached to the implement coupling rod 16 is pressed into the hook 12. During this downward movement of the rod 16, the ball 18 impinges upon the latch end upper side 52 and forces the latch end 40 to recede into the housing 24 through the side opening 34. After the ball 18 is placed in the ball socket 20 of the hook 12 the lever 38, urged by the spring 64 through the link 56, will pivot about the lever pin 44. The latch end 40 will move upwardly until the upper side 52 abuts the stop bridge 28. The groove 50 of the camber 48 reactively and lockingly engages with the ball 18 thereby restraining the radial, axial and tangential movement of the ball 18 out of the ball socket 20. The stop bridge 28 blocks any upward movement of the latch end 40. However, in spite of the entrapment of the ball 18 in the hook ball socket 20 in the locked position, the ball 18 still has a freedom to rotate about its center in all directions. This would permit certain relative rotational movement of one lower link as to another in a three-point tractor linkage.

The ball 18 can be released from the locked position, if the handle end 42 of the lever 38 is moved upwardly pivoting counterclockwise about the lever pin 44 and against the force of the spring 64 and the latch end groove-to-ball friction. The handle 42 has approximately a 2 to 1 mechanical advantage over the groove-to-ball friction. In the most upward position the jut 55 form-fittingly placed in the bridge wall pocket 54 area and the corner block 54' prevents further counterclockwise rotational movement of the handle end 42. In this unlocked position the spring 64 urges the link 56 to move downwardly. The link 56 rests against the shoulder 46, extending transversely to the lever 38 and adapted to receive the link 56, thereby transmitting the spring force to the lever 38. This spring force applied to the handle 42 at the link pin 58 creates a counter-clockwise movement as to the lever pin 44 axis when the link pin 58 passes the imaginary line between the axes of the spring pin 66 and lever pin 44. This over-the-center biasing by the spring 64 holds the lever 38 in the unlocked position, because further rotational movement of the lever 38 is inhibited by the corner block 54' of the bridge wall pocket 54, for as long as it is necessary. Conversely, in order to lock the ball 18 the handle end 42 can be rotated downwardly about the pin 44, overcoming the spring biasing by the spring 64, until the latch end clockwise movement is blocked by the stop bridge 28. The releasing from the unlocked position is boosted by the spring 64 force creating a clockwise moment about the pin 44 axis when the link pin 58 passes the imaginary line between the axis of pins 66 and 44 in the lever clockwise motion.

it is to be noted that the coupling hook is made completely insensitive to the presence of dirt or grit in the jaw due to the dirt exhaust notches made on the sides of the hook. Also the housing provides no trapped cavities and the bottom opening permits discharge of any foreign matter or material, such as dirt, trash or other matter, to be discarded therethrough. Further the specific shape and behind-the-link location of the grip portion facilitate prevention of an opening of the lock mechanism by falling crop, trees or trash.

A further advantage is that the nodular design allows the same hook to be applied to many lower link assemblies either right or left hand, or the shank integral with the housing can be angled so as to fit only right or left hand lower link. Thus it can be seen that the subject invention provides a claw hitch with the self-locking mechanism which is simple in construction, installation, and requires a minimum of moving components.

The foregoing description and drawings merely express and illustrate the invention and the invention is not limited thereto except insofar as the appended claims are so limited, as those skilled in the art who have the disclosure before them would be able to make modifications and variations therein without departing from the scope of the invention.

What is claimed is:

1. A vehicle claw hitch for self-locking of an associated coupling rod of another vehicle and comprising:
   a coupling hook having a jaw adapted to snugly receive the coupling rod;
   a lock mechanism releasably holding the coupling rod and said jaw in a locking engagement;
   said hook comprising a lock mechanism housing;
   said housing comprising latch and handle openings;
   said lock mechanism comprising a one-piece lever pivotally connected with said housing and movable between locked and unlocked positions;
   said lever having a latch end reciprocably movable through said latch opening and reactively engageable with the coupling rod in a locked position;
   spring means mounted on said housing and connected with said lever for over center spring biasing of and forcing said lever to be retained in both locked and unlocked positions by urging said lever to rotate in opposite directions; and
   said housing including blocking means reactively and abuttingly engageable with said lever in the locked and unlocked positions thereby preventing its rotation in opposite directions.

2. The claw hitch according to claim 1, said latch end having a convex chamber projection reactively and lockingly engageable with the coupling rod and
   said chamber projection permitting a multidirectional limited rotation of said coupling rod in said locked position.

3. The claw hitch according to claim 1, and said latch end having a camber projection with a groove following configuration thereof and said groove being lockingly engageable with a ball rigidly secured to said coupling rod; and
   said groove permitting a limited multidirectional rotation of said ball therein.

4. The claw hitch according to claim 1, and said jaw having a ball socket adapted to form-fittingly receive a ball of the coupling rod; and
   said jaw including dirt exhaust notches extending outwardly and downwardly relative to said hook.

5. The claw hitch according to claim 1, and
   said lever pivoting about a lever pin extending inwardly into said housing;
   said spring means comprising a link of an arcuate configuration pivotally connected with and forcing said lever to rotate in opposite directions.

6. The claw hitch according to claim 1, and said spring means comprising a link pivotally connected to said lever and biasable by a pull-off spring attached to said housing;

said lever having a shoulder extending transversely thereof and adjacent with said link;

said link resting against said shoulder and transmitting said spring force thereto thereby urging said lever to rotate counterclockwise and thus keeping it in said unlocked position; and said spring urging said link to rotate said lever clockwise for keeping it in said locked position.

7. The claw hitch according to claim 1, and said hook being a one-piece forging comprising a housing side wall with a cavity therein and a cover attached to said wall thereby closing the cavity and forming said housing;

said housing comprising a bottom opening serving as a discharge outlet for any foreign matter entered into said housing.

8. A claw hitch for a three point linkage on a tractor and comprising:

a coupling hook having a jaw adapted to receive an associated ball being unitary with an implement coupling rod;

a lock mechanism for self-locking of the ball in said jaw;

said hook comprising a lock mechanism housing;

said lock mechanism comprising a one-piece lever pivotally connected with said housing;

said lever having a handle end protruding through and outwardly of said housing and the latch end movable within and outwardly away from said housing;

said latch end comprising a convex camber portion with a groove lockingly engageable with the ball in a locked position and permitting said ball to limitedly rotate in any direction;

spring means connected with said housing and said lever for over center spring biasing of and forcing said lever to remain in both locked and unlocked positions by being placed in such a way so as to apply its force to opposite sides of said lever pivot axis; and said housing including a stop bridge abutting said lever in the locked position and a bridge wall corner block abutting said lever in the unlocked position.

9. The claw hitch according to claim 8, and said spring means comprising a link and a tension spring attached thereto and to said housing, said housing comprising:

a lever pin and said lever pivotally journalled on said pin;

said lever having a link pin and said link being slidably attached to and pivotable thereabout;

said lever comprising a shoulder being adjacent with and adapted to receive said link for reactive engagement therewith in the unlocked position, thereby transmitting said spring force via said link to said lever for restrictable rotation thereof.

10. The claw hitch according to claim 8, and said spring means comprising:

a tension spring pivotally attached to a link pivotally connected to said lever and to a spring pin extending inwardly from said housing; and said spring urging said lever to rotate in one direction in the locked position and in another direction in the unlocked position.

11. The claw hitch according to claim 8, and said housing comprising a side opening for reciprocable movement therethrough of said latch end;

a top opening for reciprocable movement therethrough of said handle end; and a bottom opening for immediate discharge of any material entered into said housing.

* * * * *